United States Patent
Christensen et al.

(10) Patent No.: US 9,093,670 B2
(45) Date of Patent: Jul. 28, 2015

(54) ELECTROLYTE ADDITIVE FOR METAL-AIR BATTERIES

(71) Applicant: Robert Bosch GmbH, Stuttgart (DE)

(72) Inventors: John F. Christensen, Mountain View, CA (US); Timm Lohmann, Mountain View, CA (US); Paul Albertus, Mountain View, CA (US); Boris Kozinsky, Waban, MA (US); Roel Sanchez-Carrera, Sommerville, MA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 13/912,756

(22) Filed: Jun. 7, 2013

(65) Prior Publication Data

US 2013/0330641 A1 Dec. 12, 2013

Related U.S. Application Data

(60) Provisional application No. 61/656,804, filed on Jun. 7, 2012.

(51) Int. Cl.
- H01M 8/00 (2006.01)
- H01M 4/86 (2006.01)
- H01M 4/88 (2006.01)
- H01M 12/08 (2006.01)

(52) U.S. Cl.
CPC ............. *H01M 8/00* (2013.01); *H01M 4/8657* (2013.01); *H01M 4/8668* (2013.01); *H01M 4/88* (2013.01); *H01M 12/08* (2013.01); *Y02E 60/50* (2013.01)

(58) Field of Classification Search
None
See application file for complete search history.

(56) References Cited

U.S. PATENT DOCUMENTS

| | | |
|---|---|---|
| 2009/0053594 A1 | 2/2009 | Johnson et al. |
| 2011/0117446 A1* | 5/2011 | Lucht et al. ............... 429/332 |
| 2012/0077084 A1 | 3/2012 | Christensen et al. |

FOREIGN PATENT DOCUMENTS

EP 2 264 825 A1 12/2010

OTHER PUBLICATIONS

International Search Report and Written Opinion corresponding to PCT Application No. PCT/US2013/044732, mailed Aug. 5, 2013 (10 pages).
Christensen et al, "A Critical Review of Li/Air Batteries", Journal of the Electrochemical Society; 2012; pp. R1-R30; vol. 159; USA (30 pages).
McCloskey et al, "Solvents' Critical Role in Nonaqueous Lithium—Oxygen Battery Electrochemistry", The Journal of Physical Chemistry Letters; 2011; pp. 1161-1166; vol. 2; USA (6 pages).

* cited by examiner

*Primary Examiner* — Patrick Ryan
*Assistant Examiner* — Wyatt McConnell
(74) *Attorney, Agent, or Firm* — Maginot Moore & Beck LLP

(57) ABSTRACT

In accordance with one embodiment, an electrochemical cell includes a negative electrode including a form of lithium, a positive electrode spaced apart from the negative electrode and including an electron conducting matrix and a lithium insertion material wherein $Li_2O_2$ is formed as a discharge product, a separator positioned between the negative electrode and the positive electrode, an electrolyte including a salt, and a polymer coating on the lithium insertion material, the polymer coating permeable to lithium ions and impermeable to the electrolyte.

6 Claims, 2 Drawing Sheets

ELECTROLYTE ADDITIVE FOR METAL-AIR BATTERIES

This application claims the benefit of U.S. Provisional Application No. 61/656,804, filed Jun. 7, 2012, the entire contents of which are herein incorporated by reference.

TECHNICAL FIELD

This invention relates to batteries and more particularly to metal/air based batteries.

BACKGROUND

A typical Li-ion cell contains a negative electrode, the anode, a positive electrode, the cathode, and a separator region between the negative and positive electrodes. One or both of the electrodes contain active materials that react with lithium reversibly. In some cases the negative electrode may include lithium metal, which can be electrochemically dissolved and deposited reversibly. The separator and positive electrode contain an electrolyte that includes a lithium salt.

Charging a Li-ion cell generally entails a generation of electrons at the positive electrode and consumption of an equal amount of electrons at the negative electrode with the electrons transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the opposite reactions occur.

Li-ion cells with a Li-metal anode may have a higher specific energy (in Wh/kg) and energy density (in Wh/L) compared to batteries with conventional carbonaceous negative electrodes. This high specific energy and energy density makes incorporation of rechargeable Li-ion cells with a Li-metal anode in energy storage systems an attractive option for a wide range of applications including portable electronics and electric and hybrid-electric vehicles.

At the positive electrode of a conventional lithium-ion cell, a lithium-intercalating oxide is typically used. Lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal (3863 mAh/g).

Moreover, the low realized capacities of conventional Li-ion cells reduces the effectiveness of incorporating Li-ion cells into vehicular systems. Specifically, a goal for electric vehicles is to attain a range approaching that of present-day vehicles (>300 miles). Obviously, the size of a battery could be increased to provide increased capacity. The practical size of a battery on a vehicle is limited, however, by the associated weight of the battery. Consequently, the Department of Energy (DOE) in the USABC Goals for Advanced Batteries for EVs has set a long-term goal for the maximum weight of an electric vehicle battery pack to be 200 kg (this includes the packaging). Achieving the requisite capacity given the DOE goal requires a specific energy in excess of 600 Wh/kg.

Various materials are known to provide a promise of higher theoretical capacity for Li-based cells. For example, a high theoretical specific capacity of 1168 mAh/g (based on the mass of the lithiated material) is shared by $Li_2S$ and $Li_2O_2$, which can be used as cathode materials. Other high-capacity materials include $BiF_3$ (303 mAh/g, lithiated) and $FeF_3$ (712 mAh/g, lithiated) as reported by Amatucci, G. G. and N. Pereira, "Fluoride based electrode materials for advanced energy storage devices," *Journal of Fluorine Chemistry*, 2007. 128(4): p. 243-262. Unfortunately, all of these materials react with lithium at a lower voltage compared to conventional oxide positive electrodes. Nonetheless, the theoretical specific energies are still very high (>800 Wh/kg, compared to a maximum of ~500 Wh/kg for a cell with lithium negative and conventional oxide positive electrodes).

One Li-based cell that has the potential of providing a driving range above 300 miles incorporates a lithium metal negative electrode and a positive electrode reacting with oxygen obtained from the environment or an onboard $O_2$ storage tank. The weight of this type of system may be reduced if the $O_2$ is not carried onboard the vehicle. Practical embodiments of this lithium-air battery may achieve a practical specific energy of 600 Wh/kg because the theoretical specific energy is 11,430 Wh/kg for Li metal, and 3,460 Wh/kg for $Li_2O_2$. Other Metal/air batteries, such as Zn, Al, Si, Mg, and others, also have a very high specific energy.

A typical metal/air electrochemical cell 10 is depicted in FIG. 1. The cell 10 includes a negative electrode 12, a positive electrode 14, a porous separator 16, and a current collector 18. The negative electrode 12 is typically metallic lithium. The positive electrode 14 includes carbon particles such as particles 20 possibly coated in a catalyst material (such as Au or Pt) and suspended in a porous, electrically conductive matrix 22. An electrolyte solution 24 containing a salt such at $LiPF_6$ dissolved in an organic solvent such as dimethyl ether or $CH_3CN$ permeates both the porous separator 16 and the positive electrode 14. The $LiPF_6$ provides the electrolyte with an adequate conductivity which reduces the internal electrical resistance of the cell 10 to allow a high power.

The positive electrode 12 is enclosed by a barrier 26. The barrier 26 in FIG. 1 is formed from an aluminum mesh configured to allow oxygen from an external source 28 to enter the positive electrode 14. The wetting properties of the positive electrode 14 prevent the electrolyte 24 from leaking out of the positive electrode 14. Oxygen from the external source 28 enters the positive electrode 14 through the barrier 26 while the cell 10 discharges, and oxygen exits the positive electrode 14 through the barrier 26 as the cell 10 is charged. In operation, as the cell 10 discharges, oxygen and lithium ions combine to form a discharge product such as $Li_2O_2$ or $Li_2O$.

Thus, in current lithium/air batteries, $Li_2O_2$ is formed during discharge and the amount stored in the cathode volume directly determines the maximum capacity. Capacities on the order of 20 mAh/cm2 are desirable to obtain high battery specific energy. However, there are numerous challenges that must be solved in order to cycle lithium/air cells reversibly and maintain a high energy and power density.

Current lithium/air cells contain gas-diffusion electrodes based on porous carbon materials like carbon black, graphite, graphene, carbon fibers or carbon nanotubes. There is significant evidence that aprotic electrolyte solvents are decomposed in the presence of $Li_2O_2$ or reaction intermediates. This limits the reversibility and cycle life of aprotic Li/air cells.

What is needed therefore is a battery wherein the electrolyte solvent is separated from $Li_2O_2$. A further need exists for a battery wherein the electrolyte solvent is separated from reaction intermediates.

SUMMARY

An electrochemical cell initially includes a class of electrolyte additives that polymerize on the surface of the cathode and serve as a barrier between the solvent and any of the following: $Li_2O_2$, reduced oxygen intermediates, and/or electrons.

In accordance with one embodiment, an electrochemical cell includes a negative electrode including a form of lithium, a positive electrode spaced apart from the negative electrode and including an electron conducting matrix and a lithium insertion material wherein $Li_2O_2$ is formed as a discharge product, a separator positioned between the negative electrode and the positive electrode, an electrolyte including a salt, and a polymer coating on the lithium insertion material, the polymer coating permeable to lithium ions and impermeable to the electrolyte.

In accordance with another embodiment a method of forming an electrochemical cell includes providing a negative electrode including a form of lithium, providing a positive electrode with an electron conducting matrix and a lithium insertion material, providing a separator between the negative electrode and the positive electrode, providing an electrolyte including a salt, providing a separating additive in the electrolyte, and forming a polymer coating on the lithium insertion material using the separating additive in the electrolyte.

In one embodiment, a Li/air cell includes an additive in the electrolyte that polymerizes on the surface of the electrode and provides a barrier between the solvent and one or more of the following: $Li_2O_2$, reduced oxygen intermediates, and/or electrons.

The process of polymerization can be achieved in a variety of ways, but one method includes discharging the cell without supplying oxygen or air to the cathode, such that the additive molecule is reduced at the surface of the positive electrode (e.g., VC is reduced at ~0.8 V vs. Li/Li+). Li ions may participate in formation of the polymer product on the surface of the electrode. The resulting polymer in some embodiments coats the electrode conformally, has a high elastic modulus and can accommodate changes in volume between the polymer layer and the underlying electrode material, is permeable to Li ions and oxygen, and is impermeable to the solvent, electrons, lithium peroxide, and oxygen anions, including superoxide.

DETAILED DESCRIPTION

Figure 1:
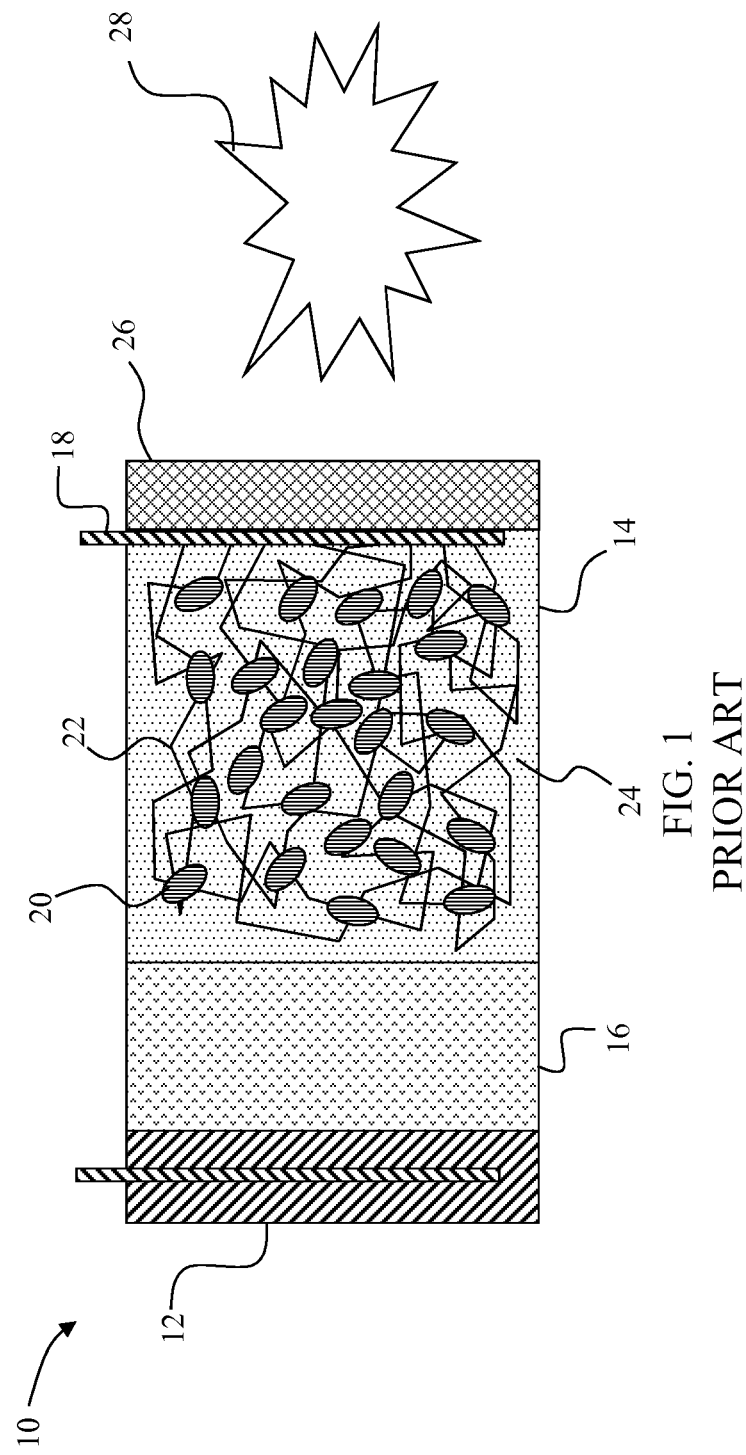
FIG. 1 depicts a schematic view of a prior art lithium-ion cell including two electrodes and an electrolyte.
Figure 2:
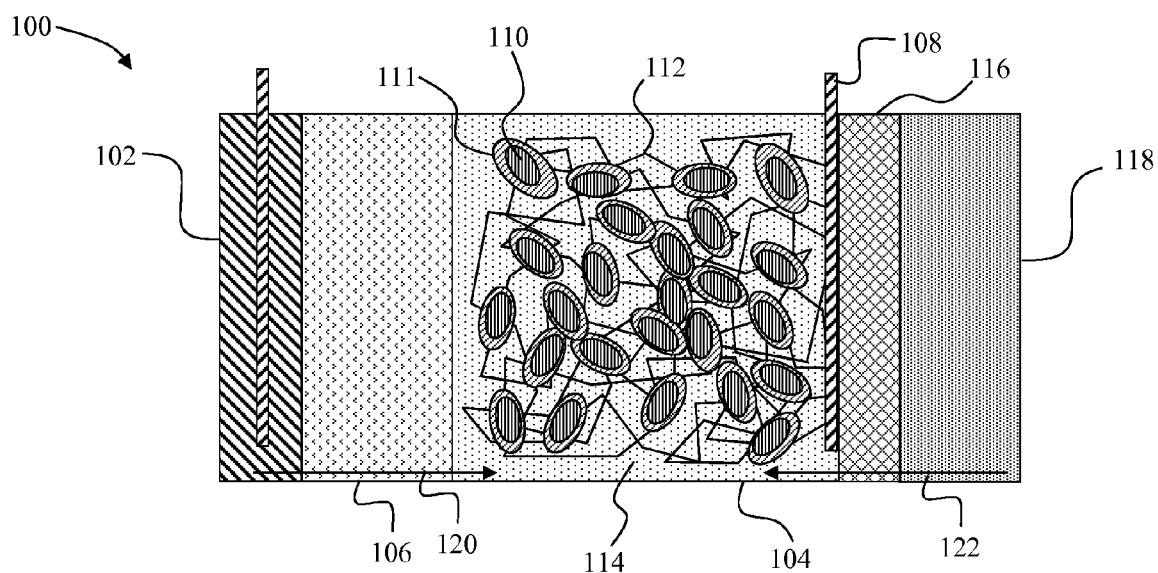
FIG. 2 depicts a schematic view of a lithium-air (Li/air) cell with two electrodes and a reservoir configured to exchange oxygen with a positive electrode, including a lithium insertion material which is surrounded by a polymer coating.

A schematic of an electrochemical cell 100 is shown in FIG. 2. The electrochemical cell 100 includes a negative electrode 102 separated from a positive electrode 104 by a porous separator 106. The negative electrode 102 may be formed from lithium metal or a lithium-insertion compound (e.g., graphite, silicon, tin, LiAl, LiMg, $Li_4Ti_5O_{12}$), although Li metal affords the highest specific energy on a cell level compared to other candidate negative electrodes.

The positive electrode 104 in this embodiment includes a current collector 108 and lithium insertion material 110, covered in a polymer material 111, suspended in a porous matrix 112. The porous matrix 112 is an electrically conductive matrix formed from a conductive material such as conductive carbon or a nickel foam, although various alternative matrix structures and materials may be used. In some embodiments, a binder is used in the electrically conductive porous matrix 112. The separator 106 prevents the negative electrode 102 from electrically connecting with the positive electrode 104.

The electrochemical cell 100 includes an electrolyte solution 114 present in the positive electrode 104 and in some embodiments in the separator 106. In the exemplary embodiment of FIG. 2, the electrolyte solution 114 includes a salt, $LiPF_6$ (lithium hexafluorophosphate), dissolved in a solvent mixture. The Li-conducting salt, provided at 0.01 to 3 M, preferably 0.1 to 1 M, in other embodiments includes one or more of $LiClO_4$, LiTFSI, Lithium Triflate, and LiBoB.

The solvent mixture may be an organic solvent and/or ionic liquids. In certain embodiments, the solvent is one or more compounds from the following classes of organic molecules: carbonates (e.g., ethylene carbonate, dimethyl carbonate); ethers (e.g., dimethoxy ethane); sulfones (e.g., DMSO); nitriles (e.g., adiponitrile), amides (e.g., DMA), and ionic liquids.

A barrier 116 separates the positive electrode 104 from a reservoir 118. The reservoir 118 may be the atmosphere or any vessel suitable to hold oxygen and other gases supplied to and emitted by the positive electrode 104. While the reservoir 118 is shown as an integral member of the electrochemical cell 100 attached to the positive electrode 104, alternate embodiments could employ a flow field, hose, or other conduit to place the reservoir 118 in fluid communication with positive electrode 104. Various embodiments of the reservoir 118 are envisioned, including rigid tanks, inflatable bladders, and the like. In FIG. 4, the barrier 116 is a mesh which permits oxygen and other gases to flow between the positive electrode 104 and the reservoir 118 while also preventing the electrolyte 114 from leaving the positive electrode 104.

The electrochemical cell 100 may discharge with lithium metal in the negative electrode 102 ionizing into a $Li^+$ ion with a free electron $e^-$. $Li^+$ ions travel through the separator 106 in the direction indicated by arrow 120 toward the positive electrode 104. Oxygen is supplied from the reservoir 118 through the barrier 116 as indicated by the arrow 122. Free electrons $e^-$ flow into the positive electrode 104 through the current collector 108 as indicated by arrow 124.

The oxygen atoms and $Li^+$ ions within the positive electrode 102 form a discharge product inside the positive electrode 104. As seen in the following equations, during the discharge process metallic lithium is ionized, combining with oxygen and free electrons to form $Li_2O_2$ or $Li_2O$ discharge product that may deposit onto the surfaces of the lithium insertion material 110.

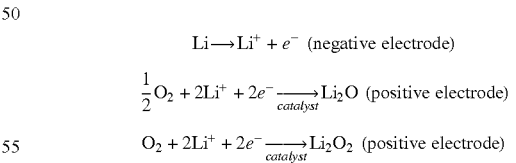

In the foregoing process, the $Li^+$ ions pass through the polymer material 111 while the electrolyte solution 114 itself does not actually contact the lithium insertion material 110. Thus, $Li_2O_2$ formed in the cathode 104 is protected from the electrolyte solution 114. The polymer material 111 is formed using a separating additive which can be provided in the electrolyte solution 114 prior to operation of the cell 100. In different embodiments, the separating additive includes one or more of vinylene carbonate, fluoroethylene carbonate, and ethylene sulfite.

The separating additive in one embodiment is polymerizable via one or more processes, including but not limited to electrochemical reduction, electrochemical oxidation, light-induced polymerization, and heating. Preferably, the separating additive is permeable to Li ions and optionally oxygen, but impermeable to solvent, electrons, lithium peroxide, and oxygen anions such as superoxide. In some embodiments, the polymer is elastic and able to accommodate volume change.

In one embodiment, the separating additive (vinylene carbonate, etc.) is added to the electrolyte such that they comprise 0.1 to 5 wt %, preferably 0.5 to 2 wt % prior to normal operation of the cell 100. The cell 100 is then discharged without supplying oxygen or air to the cathode (a non-normal operating mode), such that the additive molecule is reduced at the surface of the positive electrode (e.g., vinylene carbonate is reduced at ~0.8 V vs. Li/Li+). Li ions may participate in formation of the polymer product on the surface of the electrode. The resulting polymer in some embodiments coats the electrode conformally, has a high elastic modulus and can accommodate changes in volume between the polymer layer and the underlying electrode material, is permeable to Li ions and oxygen, and is impermeable to the solvent, electrons, lithium peroxide, and oxygen anions, including superoxide.

In one embodiment, an electrochemical cell, in the form of a Li/air cell, includes a Li metal anode, a composite cathode consisting of a porous, electronically conducting framework, a separator that provides electronic separation between the Li metal anode and the cathode compartment of the cell, an electrolyte that fills the pores of the cathode and includes a lithium salt, and a separating additive (additive X). In some embodiments, the cell further includes one or more solvents. In some embodiments, the cell includes other additives. In further embodiments, the cell includes dissolved oxygen.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

What is claimed is:

1. A method of forming a metal-air electrochemical cell comprising:
   providing a negative electrode including a form of lithium;
   providing a positive electrode with an electron conducting matrix and a lithium insertion material;
   providing a separator between the negative electrode and the positive electrode;
   providing an electrolyte including a salt;
   providing a separating additive in the electrolyte;
   providing a barrier configured to prevent the electrolyte from flowing therethrough while permitting oxygen to flow into and out of the positive electrode; and
   forming a polymer coating on the lithium insertion material using the separating additive in the electrolyte by discharging the cell while isolating the positive electrode from oxygen such that the separating additive is reduced at a surface of the lithium insertion material.

2. The method of claim 1, wherein providing the separating additive comprises:
   providing vinylene carbonate.

3. The method of claim 1, wherein providing the separating additive comprises:
   providing fluoroethylene carbonate.

4. The method of claim 1, wherein providing the separating additive comprises:
   providing ethylene sulfite.

5. The method of claim 1, wherein providing the separating additive comprises:
   providing 0.1 to 5 weight percent separating additive.

6. The method of claim 5, wherein providing the separating additive comprises:
   providing 0.5 to 2 weight percent separating additive.

* * * * *